H. N. WAYNE.
SELF SEALING INNER TUBE FOR AUTOMOBILE TIRES.
APPLICATION FILED AUG. 21, 1920.
1,428,570. Patented Sept. 12, 1922.
2 SHEETS—SHEET 2.
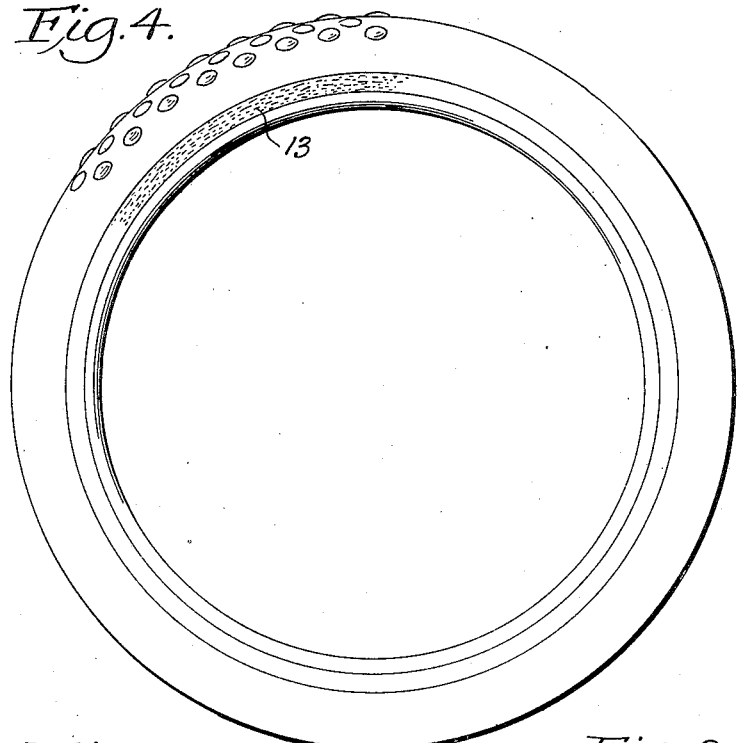
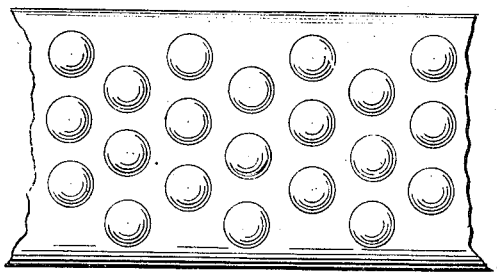
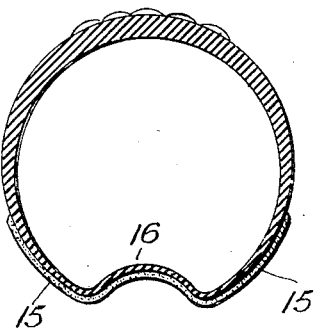
Inventor
Herbert N. Wayne
By
Attorney Patented Sept. 12, 1922.

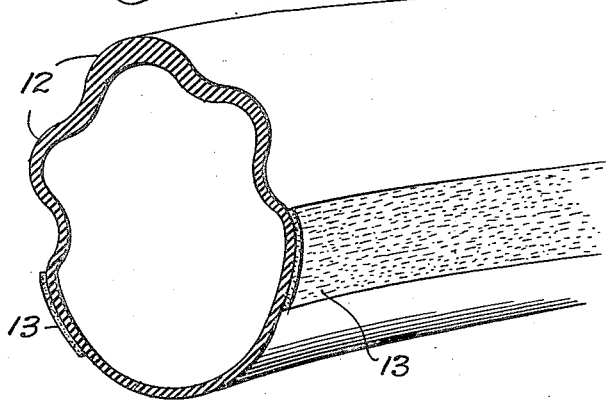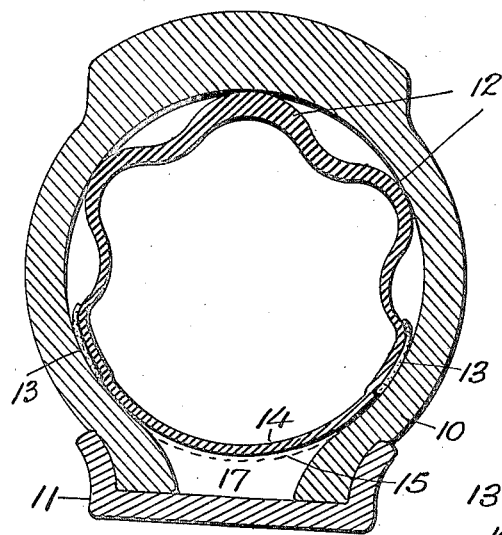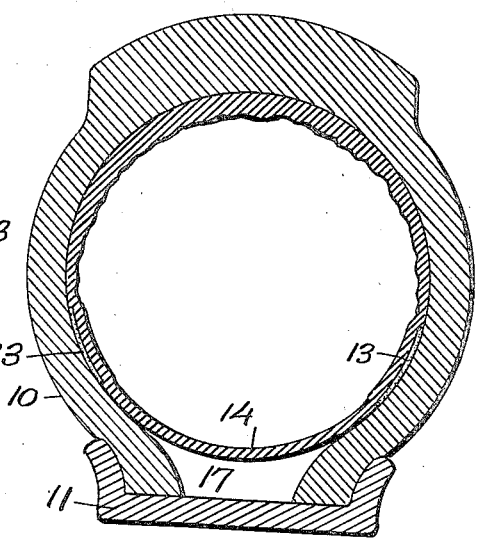

1,428,570

UNITED STATES PATENT OFFICE.

HERBERT N. WAYNE, OF WASHINGTON, DISTRICT OF COLUMBIA.

SELF-SEALING INNER TUBE FOR AUTOMOBILE TIRES.

Application filed August 21, 1920. Serial No. 405,006.

*To all whom it may concern:*

Be it known that I, HERBERT N. WAYNE, a citizen of the United States, residing at Washington, in the District of Columbia, have invented certain new and useful Improvements in Self-Sealing Inner Tubes for Automobile Tires; and I do hereby declare the following to be a full, clear, and exact description of the invention, such as will enable others skilled in the art to which it appertains to make and use the same.

This invention relates to inner tubes to carry air pressure inside pneumatic tires and the general object of this invention is to provide means whereby the tube will be rendered self-sealing when punctured; it is a further object to provide certain particular improvements whereby the side walls of the tube will be held in relatively fixed position when the tube is inflated; it is also a further object to provide an inner tube construction whereby freer expansibility may be allowed in the inner circumferential portion, commonly termed the rim portion, than in the outer circumferential portion, commonly termed the tread portion.

The invention, its features and the manner in which it accomplishes its objects, will be best understood from the following description, reference being had for this purpose to the accompanying drawings;

Fig. 1 is a perspective view of a section of inner tube constructed in accordance with the invention.

Fig. 2 is a cross section of the improved tube in the casing.

Fig. 3 is a cross section of the tube in place in a casing, showing the manner of its adjustment when inflated.

Fig. 4 is a reduced elevation of the tubes.

Fig. 5 is a plan view showing cup shaped depressions in the outer circumferential portion of the tube.

Fig. 6 is a section view of the cup shaped depressions shown in Fig. 5.

Fig. 7 is a bead filler, to fill the bead channel 17, Fig. 2.

Fig. 8 is a sectional modification of Fig. 2.

15 represents the restraining band extending completely around the concaved inner circumferential portion of the tire.

10 indicates the tire casing; 11 indicates the metal rim; 12 indicates the inner tube and particularly the upper or tread portion thereof; 13 indicates the restraining bands, made integral with the lower portion of the side walls; 14 indicates the lower or rim portion of the tube; 15 indicates an extension of the restraining bands (13) to completely cover the rim portion of the tube; 16 indicates a modified form of the rim section of the tube; 17 indicates the bead-channel or open space lying between the toe of the beads and the rim and deflated tube.

I am aware that a tube having a corrugated surface with the plane of the corrugations running lengthwise of the tube is not new, but heretofore no commercially practicable means has been devised to suitably restrain the lateral extension, in cross sectional circumference, of these corrugations; the lateral extension or "straightening out" of these corrugations defeats the object attempted which is the compression effect desired in a self-sealing (or so-called puncture proof) tube. I overcome this objection in a simple and economical manner by providing relatively non-extensible restraining bands (13), preferably made of a fibrous rubber compound, such as ground mineral or vegetable fibre with rubber and suitable vulcanizing agents, or I may use a cord or woven fabric strip impregnated with rubber. The function of these strips is to "restrain" or hold the tube in a relatively fixed position at the points where the restraining strips come into contact with the tire casing when the tube is inflated. By thus holding the side walls of the tube in this relatively fixed position it is evident that when the tube is inflated the outer circumferential portion will be restrained from expanding laterally but instead will be flatted and compressed against the outer periphery of the inside of the casing, and the inner circumferential portion (below the restraining bands) will expand downward to conform to the contour of the bead line channel.

If it is desired to avoid this downward expansion into the bead line channel, and thus insure against any possibility of pinching the tube, I may extend the strips (13) to form one continuous band around the inner circumferential portion of the tube, as shown by dotted lines (15 Fig. 2), in which event I would use a channel filler (Fig. 7) and preferably mold the tube with a concave base as shown by dotted lines, (16 Fig. 2).

Having described the various functions and methods of construction of my improved inner tube, what I claim is:—

1. In combination, a tire casing and an inner tube, the tube having non-elastic flexible side strips applied between the tube and the casing around the lower side walls of the tube whereby to restrain and hold the tube in relatively fixed position at said points of reinforcement and permit expansion above and below the reinforcement.

2. In combination with a pneumatic tire casing, of a pneumatic tube having a tread portion composed of soft rubber in corrugated form and adapted to have the convex portions of said corrugations contact with the wall of the casing in the unexpanded form of the tube, and a rim portion strengthened and reinforced with a layer of non-elastic flexible material thereby to restrain the tread portion from expanding circumferentially in cross section while holding said reinforced portion in relatively fixed position against the side walls of the casing.

3. In combination with a pneumatic tire casing of a pneumatic tube having a tread portion composed of soft rubber in corrugated form and a rim portion strengthened and reinforced with a layer of fibrous material mixed with rubber thereby to restrain the tread portion from expanding circumferentially in cross section while holding the rim portion in relatively fixed position.

4. In combination, a pneumatic tire casing and an inner tube, the tube having a tread portion composed of soft rubber in corrugated form; restraining means composed of fibrous material mixed with rubber and positioned below the corrugations thereby to restrain the tread portion from expanding circumferentially in cross section.

In testimony whereof I affix my signature.

HERBERT N. WAYNE.